United States Patent
Nord et al.

(10) Patent No.: US 12,081,425 B2
(45) Date of Patent: Sep. 3, 2024

(54) REPORTING SERVICE FOR DYNAMIC STATUS INFORMATION ON A DATA LINK

(71) Applicant: Sony Group Corporation, Tokyo (JP)

(72) Inventors: Lars Nord, Lund (SE); Svante Alnås, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/787,542

(22) PCT Filed: Dec. 9, 2020

(86) PCT No.: PCT/EP2020/085157
§ 371 (c)(1),
(2) Date: Jun. 20, 2022

(87) PCT Pub. No.: WO2021/136633
PCT Pub. Date: Jul. 8, 2021

(65) Prior Publication Data
US 2022/0393958 A1 Dec. 8, 2022

(30) Foreign Application Priority Data
Jan. 3, 2020 (SE) .................................. 2030001-8

(51) Int. Cl.
*H04L 43/091* (2022.01)
*H04L 43/065* (2022.01)

(52) U.S. Cl.
CPC .......... *H04L 43/091* (2022.05); *H04L 43/065* (2013.01)

(58) Field of Classification Search
None
See application file for complete search history.

(56) References Cited

U.S. PATENT DOCUMENTS

2010/0216485 A1* 8/2010 Hoole ................. H04W 52/244
455/452.2
2013/0067056 A1* 3/2013 Purkayastha ..... G06F 15/17306
709/223
(Continued)

FOREIGN PATENT DOCUMENTS

CN  106161243 A  11/2016
CN  109246653 A   1/2019
(Continued)

OTHER PUBLICATIONS

International Search Report and Written Opinion from corresponding International Application No. PCT/EP2020/085157, mailed on Mar. 3, 2021, 15 pages.
(Continued)

*Primary Examiner* — Joshua Joo
(74) *Attorney, Agent, or Firm* — Tucker Ellis LLP

(57) ABSTRACT

A method of operating a node of a communications network is provided. The node is configured to support at least one data link. The at least one data link is between the communications network and a UE. The method includes providing registration data to an exposure node of the communications network. The registration data is for a reporting service on DSI of the at least one data link. The method also includes, upon receiving a subscription request for a subscription to the reporting service, establishing the subscription to the reporting service between the node and an external application node. The external application node is associated with the subscription request. The method furthermore includes providing the DSI in accordance with the subscription to the external application node.

18 Claims, 8 Drawing Sheets

(56) References Cited

U.S. PATENT DOCUMENTS

| | | | |
|---|---|---|---|
| 2016/0191340 A1* | 6/2016 | Anakkot | H04L 67/54 |
| | | | 709/223 |
| 2016/0338128 A1* | 11/2016 | da Silva | H04W 48/02 |
| 2016/0352782 A1* | 12/2016 | Patil | H04W 8/005 |
| 2017/0118269 A1* | 4/2017 | Park | H04L 69/16 |
| 2018/0270778 A1 | 9/2018 | Bharatia | |
| 2019/0036816 A1* | 1/2019 | Evans | H04L 41/5009 |
| 2019/0104434 A1* | 4/2019 | Duan | H04W 88/16 |
| 2019/0261260 A1 | 8/2019 | Dao | |
| 2019/0268310 A1* | 8/2019 | Guberman | H04L 9/0819 |
| 2020/0021516 A1* | 1/2020 | Bajaj | H04L 45/245 |
| 2020/0068007 A1* | 2/2020 | Narayan | G06F 16/9566 |
| 2020/0169918 A1* | 5/2020 | Hwang | H04W 28/08 |
| 2020/0228576 A1* | 7/2020 | Willig | H04L 65/612 |
| 2022/0394651 A1* | 12/2022 | Sun | H04L 65/1073 |
| 2023/0047656 A1* | 2/2023 | Centonza | H04W 64/00 |
| 2023/0155943 A1* | 5/2023 | Yu | H04W 28/086 |
| | | | 709/224 |

FOREIGN PATENT DOCUMENTS

| | | |
|---|---|---|
| CN | 110557744 A | 12/2019 |
| WO | 2018175378 A1 | 9/2018 |
| WO | 2018203663 A1 | 11/2018 |
| WO | WO-2019101340 A1 | 5/2019 |

OTHER PUBLICATIONS

Swedish Search Report from corresponding Swedish Application No. 2030001-8, mailed on Nov. 17, 2020, 4 pages.

S. Kekki et al., "MEC in 5G networks," ETSI White Paper No. 28, Jun. 2018, 28 pages.

ETSI GS MEC 012 v2.1.1, "Mobile Edge Computing (MEC); Radio Network Information API," ETSI, Dec. 2019, 66 pages.

Sagar Arora et al., "Exposing radio network information in a MEC-in-NFV environment: the RNISaaS concept," IEEE Conference on Network Softwarization (NetSoft), Jun. 24, 2019, 6 pages.

ETSI GS MEC 012 v1.1.1, "Multi-access Edge Computing (MEC); Radio Network Information API," ETSI, Jul. 2017, 57 pages.

ETSI GS MEC 009 v2.1.1, "Multi-access Edge Computing (MEC); General Principles for MEC Service APIs," ETSI, Jan. 2019, 64 pages.

3rd Generation Partnership Project (3GPP), "Technical Specification Group Core Network and Terminals; Common API Framework for 3GPP Northbound APIs; (Release 16)," 3GPP TS 29.222 v16.1.0, Dec. 2019, 136 pages.

Chinese Office Action dated Aug. 3, 2023 for Application Serial No. 202080097290 (6 pages).

* cited by examiner

REPORTING SERVICE FOR DYNAMIC STATUS INFORMATION ON A DATA LINK

TECHNICAL FIELD

Various examples generally relate to subscriptions for a reporting service on dynamic status information of a data link. Various examples specifically relate to exposure of the dynamic status information to nodes external from a communications network.

BACKGROUND

Mobile communication is widespread. Terminals (or wireless communication device or user equipment, UE) can communicate with a communications network. The communications network can be implemented as a cellular network, having a radio-access network (RAN) including multiple radio-access nodes (or base stations, BSs) associated with respective cells in the coverage area.

Service providers—typically different from an operator of the communications network—can provide data services to the UEs connected to the communications network. Example data services would include, e.g., connected industrial machines, autonomous driving, transport logistics, etc. One example of a data service is edge computing (EC), e.g., mobile-edge computing (MEC). Using EC, low-latency services are facilitated. See, e.g., European Telecommunications Standards Institute (ETSI) White Paper No. 28 (June 2018) Sami Kekki et al..

Such data services are provided to a UE by communicating application data associated with a respective data service along at least one data link. The at least one data link can extend between the UE and a server that executes an application associated with the application data. The server can be implemented at or controlled by an application node (AN).

Example ANs include: applications on the Internet, EC servers, 3GPP 5G Application Functions.

For this purpose, the protocols of the communications network can specify application-programming interfaces (APIs) that can be accessed by ANs external to the communications network (NW), to provide the service by communicating along the at least one data link. Using the API, the at least one data link can be established, managed, etc.

For 3GPP-specified cellular communications NWs is a standardized framework available for controlling APIs, the Common API framework (CAPIF), see Third Generation Partnership Project (3GPP) Technical Specification (TS) 23.222 V16.5.0 (2019-09).

EC generally allows executing applications required for providing a service to the UE at the edge of the communications NW so that low latency, proximity, high bandwidth and up-to-date radio NW information can be implemented. Information on current radio conditions can be shared in ETSI MEC via the Radio NW Information Service (RNIS) protocol. Typical information that may be provided includes up-to-date radio NW information regarding radio NW conditions, measurement information related to the user plane See ETSI GS MEC V1.1.1 (2017-7), section 5.1.

It has been found that providing dynamic status information (DSI) on at least one data link of an API using the RNIS protocol faces certain restrictions and drawbacks. For example, providing the DSI on the at least one data link using such reference implementations can experience significant latency.

SUMMARY

Accordingly, there is a need for advanced techniques of providing DSI on the at least one data link.

This need is met by the features of the independent claims. The features of the dependent claims define embodiments.

A method of operating a node of a communications network is provided. The node is configured to support at least one data link. The at least one data link is between the communications network and a UE. The method includes providing registration data to an exposure node of the communications network. The registration data is for a reporting service on DSI of the at least one data link. The method also includes, upon receiving a subscription request for a subscription to the reporting service, establishing the subscription to the reporting service between the node and an external application node. The external application node is associated with the subscription request. The method furthermore includes providing the DSI in accordance with the subscription to the external application node.

A computer program or a computer program product or a computer-readable storage medium includes program code that can be executed by least one processor. Executing the program code causes the at least one processor to perform a method of operating a node of a communications network. The node is configured to support at least one data link. The at least one data link is between the communications network and a UE. The method includes providing registration data to an exposure node of the communications network. The registration data is for a reporting service on DSI of the at least one data link. The method also includes, upon receiving a subscription request for a subscription to the reporting service, establishing the subscription to the reporting service between the node and an external application node. The external application node is associated with the subscription request. The method furthermore includes providing the DSI in accordance with the subscription to the external application node.

A node of a communications network is configured to support at least one data link between the communications network and a UE. The node includes control circuitry. The control circuitry is configured to provide registration data for a reporting service on DSI of the at least one data link. The registration data is provided to an exposure node of the communications network. The control circuitry is also configured, upon receiving a subscription request for a subscription to the reporting service, to establish the subscription to the reporting service between the node and an external application node associated with the subscription request. The control circuitry is also configured to provide the DSI in accordance with the subscription to the external application node.

A method of operating an exposure node of a communications network is provided. The method includes obtaining registration data. The registration data is for a reporting service that is provided by a node of the communications network. The node supports at least one data link between a UE and the communications network. The reporting service is for DSI of the at least one data link. The method also includes advertising the reporting service to multiple candidate external application nodes.

A computer program or a computer program product or a computer-readable storage medium includes program code that can be executed by least one processor. Executing the program code causes the at least one processor to perform a method of operating an exposure node of a communications network. The method includes obtaining registration data. The registration data is for a reporting service that is provided by a node of the communications network. The node supports at least one data link between a UE and the communications network. The reporting service is for DSI of the at least one data link. The method also includes advertising the reporting service to multiple candidate external application nodes.

An exposure node of a communications network includes control circuitry. The control circuitry is configured to obtain registration data for a reporting service. The reporting service is provided by a node of the communications network. The node supports at least one data link between a UE and the communications network. The reporting service is for DSI of the at least one data link. The control circuitry is further configured to advertise the reporting service to multiple candidate external application nodes.

A method of operating an external application node is provided. The external application node is connected to a communications network. The method includes establishing a subscription to a reporting service. The reporting services provided by a node of the communications network. The node supports at least one data link. The at least one data link is between the communications network and a UE. The reporting service is for DSI of the at least one data link. The method also includes obtaining the DSI in accordance with the subscription from the node.

A computer program or a computer program product or a computer-readable storage medium includes program code that can be executed by least one processor. Executing the program code causes the at least one processor to perform a method of operating an external application node of a communications network. The external application node is connected to a communications network. The method includes establishing a subscription to a reporting service. The reporting services provided by a node of the communications network. The node supports at least one data link. The at least one data link is between the communications network and a UE. The reporting service is for DSI of the at least one data link. The method also includes obtaining the DSI in accordance with the subscription from the node.

An external application node is connected to a communications network. The external application node includes control circuitry. The control circuitry is configured to establish a subscription to a reporting service. The reporting services provided by a node of the communications network. The node supports at least one data link between the communications network and a UE. The reporting service is for DSI of the at least one data link. The control circuitry is further configured to obtain the DSI in accordance with the subscription from the node.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
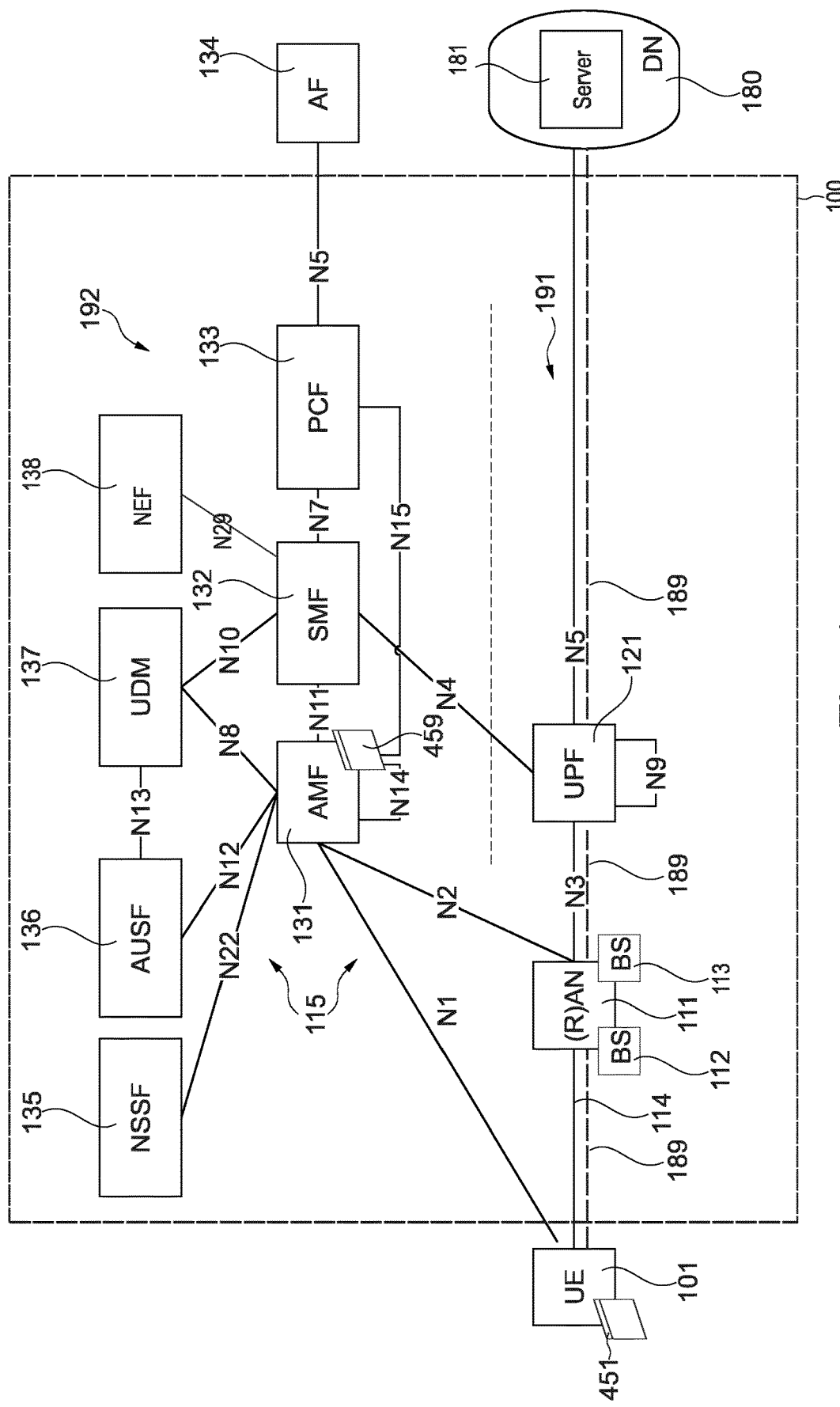
FIG. 1 schematically illustrates a cellular NW and an external AN according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection.

Functional blocks may be implemented in hardware, firmware, software, or a combination thereof.

Hereinafter, techniques of providing a data service to a UE connected to a communications NW are described. The data service can be provided by using a communication of application data along at least one data link. The application data can be communicated to and/or from the UE. The at least one data link can be influenced using an API, e.g., specific policies or quality of service requirements of the data service. In some examples, the at least one data link can be setup, managed, and/or released using an API. The API can be used by an external AN external to the communications NW. The at least one data link can be supported by one or more nodes of the communications NW. A server of the AN can execute an application to provide and/or consume the application data of the at least one data service. The server can host an execution environment for executing the application. The application may receive the application data from the UE by using the communication along the at least one data link of the API, and/or may transmit the application data to the UE by using the communication along the at least one data link of the API.

As a general rule, the API used for providing a service such as the data service may be configured by using the CAPIF protocol or another API protocol.

As a general rule, various kinds and types of communications NWs may be employed. For example, cellular communications NWs including a RAN and a core NW (CN) can be used. For example, a 3GPP Long Term Evolution (LTE) or New Radio (NR) cellular communications NW may be used. Hereinafter, for sake of simplicity, various examples are described in connection with a 3GPP NR cellular communications NW, but similar techniques may be readily applied to other kinds and types of communications NWs, e.g., IEEE Wi-Fi, etc.

Various techniques help to provide the data service at low latency and high quality of service. In particular, the data service can be provided to the UE depending on DSI of the at least one data link. For example, the execution of the application can be configured depending on the DSI. A migration of the application could be triggered. The at least one data link could be re-routed depending on the DSI.

As a general rule, the DSI can characterise a current state of the at least one data link. Thus, the DSI may be referred to as run-time information. For example, the DSI could indicate a state of health of the at least one data link. The DSI can vary over the course of time, hence, the prefix "dynamic". Such changes over the course of time can be due to changing traffic conditions of the cellular NW.

As a further general rule, the DSI may pertain to one or more sections along the at least one data link within the cellular NW. For instance, the DSI could characterise the current state of a section of the at least one data link implemented on a wireless link of the cellular NW, i.e., at the RAN of the cellular NW. Alternatively or additionally, the DSI could characterise the current state of the core-NW (CN) section of the at least one data link between, e.g., gateways or other user-plane nodes of the CN. DSI is not limited to for example the current status of the at least one data link: the DSI may alternatively or additionally include an intended or requested status of the at least one data link. For example, the DSI may be indicative of an intended utilization of the at least one data link: for example the at least one data link may be 100% operational, but is some cases that is without any delays and in other cases the applications may want to use it 500% so it only support 20% of the wished data. This could for example be measured in the pending sending and receiving buffers in both ends.

The determining of the DSI may also take statistics and/or AI (e.g., machine learning algorithms such as a neural network or a support vector machine) into account, for example some recognized sequences of data may result in high load soon that is possible to dynamically adjust to.

The DSI may be generally specific to a particular data link; i.e., DSI associated with different data links may be different. As such, the DSI may also be specific for the UE associated with the data service for which the at least one data link is used.

As a general rule, the DSI can be determined by a reporting node. The reporting node may support the at least one data link, e.g., a specific section of the at least one data link.

Supporting the at least one data link can include one or more of the following: forwarding application data along the at least one data link; controlling a gateway node or another node that forwards application data along the at least one data link. The supporting of the at least one data link can be in accordance with an API or multiple APIs.

Along with variations in the section of the at least one data link to which the DSI pertains, also the reporting node can vary. For instance, the reporting node may be implemented by a BS. In such a scenario, it would be possible that the DSI pertains to a section of the at least one data link along the wireless link of the cellular NW. In a further example, the reporting node can be implemented by a CN-node of the cellular NW, e.g., a control-plane node or a user-plane node. Examples would include a mobility-control node or a session-control node that controls data links in the user plane or gateway nodes of the user plane that forward/route data along data links.

Using the techniques described herein, a subscription to a reporting service for the DSI is facilitated: as part of the subscription, the DSI can be repeatedly notified to the respective subscriber, to take into account the changes over the course of time. A message can be repeatedly transmitted by the reporting node, wherein the message includes the DSI. Typically, the subscriber of the subscription to the reporting service is the AN associated with the data service.

The reporting service can be implemented or provided as an API.

To give a few non-limiting examples of the DSI: the DSI could include, e.g., a bit flow along the at least one data link, e.g., along a respective section of the at least one data link. The bit flow may be indicative of the data throughput along the at least one data link. The DSI could include a quality of service of the communication of the application data along the at least one data link. The quality of service could be defined relatively with respect to certain quality of service requirements associated with the respective data service. The DSI could be indicative of a mobility state of the UE to which the data service is provided. For example, the DSI could be indicative of whether the UE is moving, e.g., from cell to cell of the radio access NW of the cellular communications NW. The DSI could be indicative of whether a handover from a source cell to the target cell has occurred or is about to occur. Another example implementation of the DSI includes a congestion level at the network node that is associated with the at least one data link. For instance, the congestion level could be determined depending on a buffer fill level of corresponding transmit buffers of gateways or other user-plane nodes or access nodes supporting the at least one data link.

As a general rule, the DSI can have a limited validity, e.g., a few milliseconds or seconds or minutes. After expiry of the validity, the DSI is outdated.

Such and other implementations of the DSI facilitate operation of the server of the AN when providing the data service to the UE using the communication along the at least one data link. The data service can be provided and adjusted depending on the DSI. For instance, the AN can control the server executing the application accordingly.

While—as a general rule—the particular use of the DSI is not germane for the functioning of the techniques described herein, nonetheless, a couple of non-limiting examples regarding the use of the DSI will be described below. For instance, it would be conceivable that the DSI indicates an increasing congestion level along the at least one data link. Then, the data service may be provided such that pre-buffering of respective application data is increased at the UE, to counter the congestion. Another example: A codec used for encoding the application data may be adjusted to support lower bit rates. Another conceivable countermeasure to be taken in view of the increasing congestion level could be to trigger are re-routing of the at least one data link. For instance, a congested gateway node may be avoided. Also, for mission-critical applications, in view of the risk of increased latency when providing the data service, it would be possible to transition to the application to a safe state.

Various techniques are based on the finding that low-latency provisioning of the DSI of the at least one data link using the reporting service can facilitate providing the data service associated with the at least one data link at a high quality. According to various examples, this is achieved by establishing the subscription to the corresponding reporting service for providing the DSI between the reporting node that determines the DSI (the reporting node supporting the at least one data link, e.g., at the RAN or the CN), and the AN. I.e., in other words, the reporting node and the AN can communicate directly in accordance with the subscription. The reporting node can provide the DSI in accordance with the subscription to the AN.

Such techniques are in contrast to reference implementations, according to which there is no subscription established between the reporting node and the AN; in such reference implementations, the reporting node would typically provide the DSI to an exposure node of the cellular NW and the exposure node would then, in turn, provide the DSI to the external AN. Such a 2-step communication of the DSI increases the latency of the provisioning of the DSI if compared to the direct subscription between the reporting node and the AN according to which the DSI is not routed through the exposure node, as explained above. Further, the computational resources required at the exposure node and corresponding interfaces to and from the exposure node are lowered.

Even though the exposure node may out-of-loop for the subscription for the reporting service on the DSI as explained above, the exposure node may nonetheless trigger the establishment of the subscription and/or manage the subscription and/or release the subscription. For instance, the exposure node may advertise the reporting service to multiple candidate ANs. Advertising can mean that corresponding information is made available to the multiple candidate ANs that are external of the respective NW. As a general rule, such advertising can include responding to respective queries, e.g., from candidate ANs. Such advertising can—alternatively or additionally—include pro-actively broadcasting information regarding the reporting service to candidate ANs. The ANs may be API invokers. Then, if a given AN of the multiple candidate ANs is interested in the reporting service, it can indicate a respective intention of subscription to the exposure node. The advertising may be in accordance with the CAPIF protocol. The advertising may be based on registration data for the reporting service that is provided to the exposure node by the reporting node. For example, the reporting node can publish the API associated with the reporting service to the exposure node, to provide the registration data. For instance, registration data can be broadcasted and/or provided upon a query by the exposure node. Then, upon determining the subscription intention from the AN, the exposure node may trigger the establishment of the subscription. This can include communicating with the reporting node and/or the AN. For example, respective identities may be indicated and/or access credentials may be indicated.

FIG. 1 schematically illustrates a cellular NW 100. The example of FIG. 1 illustrates the cellular NW 100 according to the 3GPP NR/5G architecture. Details of the 3GPP 5G architecture are described in 3GPP TS 23.501, version 15.3.0 (2017-09). While FIG. 1 and further parts of the following description illustrate techniques in the 3GPP 5G framework of a cellular NW, similar techniques may be readily applied to other communication protocols. Examples include 3GPP LTE 4G—e.g., in the MTC or NB-IOT framework—and even non-cellular wireless systems, e.g., an IEEE Wi-Fi technology.

In the scenario of FIG. 1, a UE 101 is connectable to the cellular NW 100. For example, the UE 101 may be one of the following: a cellular phone; a smart phone; an IOT device; a MTC device; a sensor; an actuator; etc. The UE 101 uses one or more identities 451.

The UE 101 is connectable to a core NW (CN) 115 of the cellular NW 100 via a RAN 111, typically formed by one or more BSs 112-113 (only a two BSs 112-113 are illustrated in FIG. 1 for sake of simplicity). A wireless link 114 is established between the RAN 111 —specifically between one or more of the BSs 112 of the RAN 111—and the UE 101.

The wireless link 114 implements a time-frequency resource grid. Typically, Orthogonal Frequency Division Multiplexing (OFDM) is used: here, a carrier includes multiple subcarriers. The subcarriers (in frequency domain) and the symbols (in time domain) then define time-frequency resource elements of the time-frequency resource grid. Thereby, a protocol time base is defined, e.g., by the duration of frames and subframes including multiple symbols and the start and stop positions of the frames and subframes. Different time-frequency resource elements can be allocated to different logical channels or reference signals of the wireless link 114. Examples include: Physical Downlink Shared Channel (PDSCH); Physical Downlink Control Channel (PDCCH); Physical Uplink Shared Channel (PUSCH); Physical Uplink Control Channel (PUCCH); channels for random access; etc.

The CN 115 includes a user plane (UP) 191 and a control plane (CP) 192. Application data—e.g., of a data service—is typically routed via the UP 191. For this, there is provided a UP function (UPF) 121. The UPF 121 may implement router functionality. Application data may pass through one or more UPFs 121. In the scenario of FIG. 1, the UPF 121 acts as a gateway towards a data NW (DN) 180, e.g., the Internet or a Local Area NW. Application data can be communicated between the UE 101 and one or more servers 181 of the data NW 180. The server 181 can execute an application that provides a service associated with the application data.

The cellular NW 100 also includes a mobility-control node, here implemented by an Access and Mobility Management Function (AMF) 131. The cellular NW 100 also includes a session-control node, here implemented by a Session Management Function (SMF) 132. The cellular NW 100 further includes a Policy Control Function (PCF) 133;

a NW Slice Selection Function (NSSF) 134; an Authentication Server Function (AUSF) 136; a Unified Data Management (UDM) 137, and a NW exposure node here implemented by the NW Exposure Function (NEF) 138.

An AN is implemented by an Application Function (AF) 134. The AF 134 is external to the cellular NW 100 and may or may not be in a trusted domain of the cellular NW 100. In case the AF 134 is not in the trusted domain, it can provide the PCF 133 with information via the NEF 138 (not shown in FIG. 1). The AF 134 can access the NEF 138, e.g., using CAPIF. The AF 134 may reside in a server 181 in the DN 180. The AF 134 may be part of the DN 180.

FIG. 1 also illustrates the protocol reference points N1-N22, N29 between these nodes.

The AMF 131 provides one or more of the following functionalities: connection management sometimes also referred to as registration management; NAS termination for communication between the CN 115 and the UE 101; connection management; reachability management; mobility management; connection authentication; and connection authorization. After UE registration to the NW, the AMF 131 creates a UE context 459 and keeps this UE context, at least as long as the UE 101 is registered to the cellular NW 100. The UE context 459 can hold one or more identities of the UE 101 (UE ID), e.g., temporary identities.

The SMF 132 supports a data connection. The data connection is established by the SMF 132 if the respective UE 101 operates in a connected mode. The data connection is characterized by UE subscription information hosted by the UDM 137. To keep track of the current mode of the UE 101, the AMF 131 sets the UE 101 to CM-CONNECTED or CM-IDLE. During CM-CONNECTED, a non-access stratum (NAS) connection is maintained between the UE 101 and the AMF 131. The NAS connection implements an example of a mobility control connection. The NAS connection may be set up in response to paging of the UE 101. The data connection may include one or more data flows or bearers such as a dedicated data flow/bearer or a default data flow/bearer. The state of the data connection is also defined on the RRC layer, e.g., generally Layer 3 of the OSI model. The SMF 132 provides one or more of the following functionalities: session management including session establishment, modify and release, including data flow/bearer set up of UP data flows/bearers between the RAN 111 and the UPF 121; selection and control of UPFs; configuring of traffic steering; supporting data links 189 in accordance with APIs; roaming functionality; termination of at least parts of NAS messages; etc.

The data connection can include one or more data links 189. For instance, a data link 189 can be implemented by a dedicated data flow/bearer. A protocol data unit (PDU) session can be associated with the one or more data links 189. The data link 189 is established between the UE 101 via the RAN 111 and the UP 191 of the CN 115 and towards the DN 180. The server 181 can terminate the data link 189. The data link 189 can be used for communicating application data associated with a service provided by the server 181. For example, an EC service can be provided. The data link 189 can be controlled in accordance with an API.

The NEF 138 can provide the following functionality: exposure of capabilities and events, e.g., to the AF 134, interfacing with the AF 134, authentication/authorization of applications provided by the AF 134 to use an API, translation of information exchanged between the cellular NW 100 and the AF 134, advertising APIs, and support of CAPIF.

The CAPIF mechanisms to support API operations, e.g., by supporting nodes publishing an API, by advertising published APIs, authorising, logging, and charging in the standardised manner.

Figure 2:
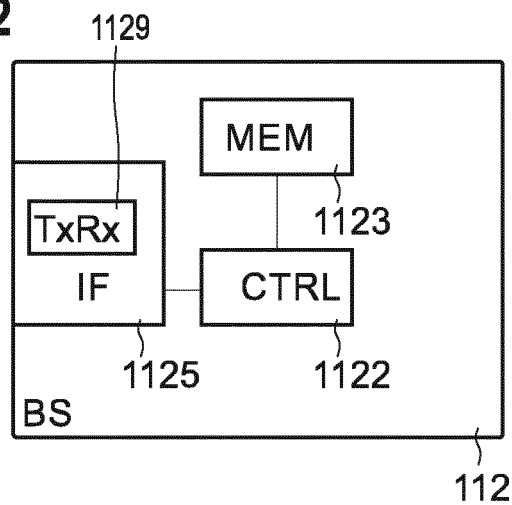
FIG. 2 schematically illustrates a BS of the cellular NW according to various examples.

FIG. 2 schematically illustrates a BS 112 according to various examples. 'The BS 112 implements an access-node of a cellular NW. The BS 112 includes a control circuitry 1122. The BS 112 also includes an interface 1125 for communicating with other nodes of the cellular NW 100 or nodes external of the cellular NW 100. The interface 1125 includes an analog transceiver 1129 for supporting the wireless link 114 to one or more UEs. The control circuitry 1122 can load program code from a memory 1123 and execute the program code. Upon executing the program code, the control circuitry 1122 can perform techniques as described herein, e.g.: communicating on the wireless link 114 with the UE 101; supporting one or more data links 189 associated with a data service provided to the UE 101, including forwarding data along the data link 189; implementing a reporting service for DSI on the data link 189, e.g., in accordance with an API, e.g., by publishing the API of the reporting service at a node such as an exposure node; establishing a subscription for the reporting service, the subscription being between the BS 112 and the AF 134; providing DSI to the AF in accordance with the subscription; migrating the subscription to a target BS, e.g., upon detecting UE mobility such as performing a handover to the target BS; etc.

Figure 3A:
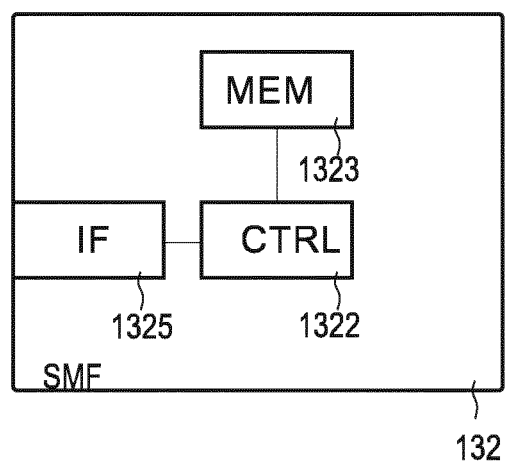
FIG. 3A schematically illustrates a session-control node configured to control a data link through the cellular NW according to various examples.

FIG. 3A schematically illustrates the SMF 132. The SMF 132 implements a CN control-plane node. The SMF 132 implements a session-management control node or simply a session-control node. The SMF 132 includes a control circuitry 1322. The SMF 132 also includes an interface 1325 for communicating with other nodes of the cellular NW 100 or external nodes such as the AF 134. The control circuitry 1322 can load program code from a memory 1323 and execute the program code. Upon executing the program code, the control circuitry 1322 can perform techniques as described herein, e.g.: supporting one or more data links 189 associated with the data service provided to the UE, including controlling the UPF 121; implementing a reporting service for DSI of the data link 189, e.g., in accordance with an API, e.g., by publishing the API of the reporting service at a node such as an exposure node; establishing a subscription for the reporting service, the subscription being between the SMF 132 and the AF 134; providing the DSI to the AF 134 in accordance with the subscription; migrating the subscription to a target SMF, e.g., upon detecting that due to UE mobility the UE 101 has moved out of the service area handled by the SMF 132; etc.

Figure 3B:
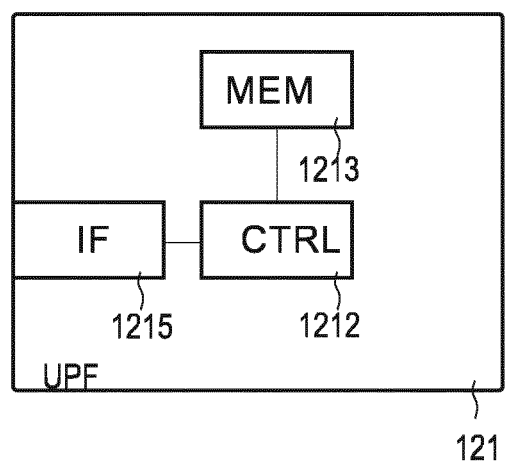
FIG. 3B schematically illustrates a gateway node in a data plane of the cellular NW according to various examples.

FIG. 3B schematically illustrates the UPF 121. The UPF 121 implements a CN user-plane node. The UPF 121 implements a gateway for forwarding application data. The UPF 121 includes a control circuitry 1212. The UPF 121 also includes an interface 1215 for communicating with other nodes of the cellular NW 100 or external nodes such as the AF 134. The control circuitry 1212 can load program code from a memory 1213 and execute the program code. Upon executing the program code, the control circuitry 1213 can perform techniques as described herein, e.g.: supporting one or more data links 189 associated with the data service provided to the UE, including acting as a gateway by forwarding the application data communicated along the one or more data links 189; implementing a reporting service for DSI of the data link 189, e.g., in accordance with an API, e.g., by publishing the API of the reporting service at a node such as an exposure node; establishing a subscription for the reporting service, the subscription being between the UPF 121 and the AF 134; providing the DSI to the AF 134 in accordance with the subscription; migrating the subscription to a target UPF, e.g., upon detecting that due to UE mobility the data link 189 has been re-routed to be handled by another UPF.

Figure 4:
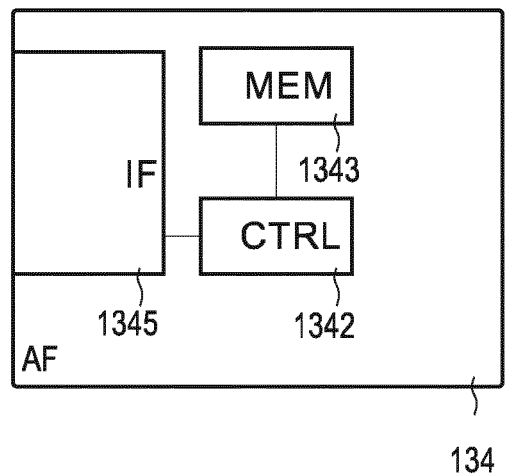
FIG. 4 schematically illustrates the external AN according to various examples.

FIG. 4 schematically illustrates the AF 134. The AF 134 includes a control circuitry 1342. The AF 134 also includes an interface 1345 for communicating with other nodes, e.g., nodes of the cellular NW 100. The control circuitry 1342 can load program code from a memory 1343 and execute the program code. Upon executing the program code, the control circuitry 1342 can perform techniques as described herein, e.g.: controlling one or more data links 189 associated with the data service provided to the UE, e.g., by appropriately controlling a respective server of the AF 134 or controlled by the AF 134 terminating the data link; controlling data service provided to or from the UE, e.g., by communicating with the NEF 138; requesting to be authorised to use an API and establishing a subscription with or without the help of the NEF 138 for a reporting service for DSI of the data link 189, the subscription being between the AF 134 and a corresponding reporting node providing the DSI; migrating the subscription to a target AF, e.g., upon detecting that—e.g., due to UE mobility—the data link 189 has been re-routed to be handled by another AF.

Figure 5:
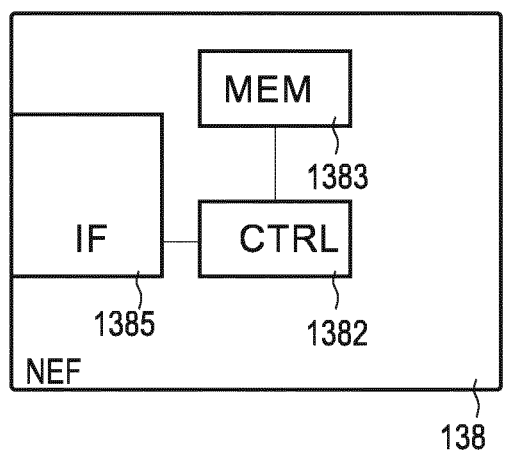
FIG. 5 schematically illustrates a NW exposure node for interfacing the cellular NW with an AN according to various examples.

FIG. 5 schematically illustrates the NEF 138. The NEF 138 implements a NW exposure node. The NEF 138 includes a control circuitry 1382. The NEF 138 also includes an interface 1385. The NEF 138 can communicate with nodes in the cellular NW 100 via the interface 1385 and can also communicate with external node such as the AF 134 via the interface 1385 (while FIG. 5 illustrates that the NEF 138 has a single interface 1385 for these tasks, the NEF 138 may also include multiple interfaces). The control circuitry 1382 can load program code from a memory 1383. Upon executing the program code, the control circuitry 1382 can perform techniques as described herein, e.g.: receiving registration data from one or more reporting nodes, the registration data pertaining to a reporting service provided by the one or more reporting node, the reporting service being on DSI of a data link of a data service provided to the UE (the registration data can be received as part of the one or more reporting nodes publishing an API associated with the reporting service); advertising/publishing the reporting service API; triggering an establishment of a subscription to the reporting service; facilitating a migration of the subscription from a source reporting node to a target reporting node, and/or from a source AN to a target AN; establishing, managing, and/or releasing a subscription to the reporting service in accordance with an API; etc.

Figure 6:
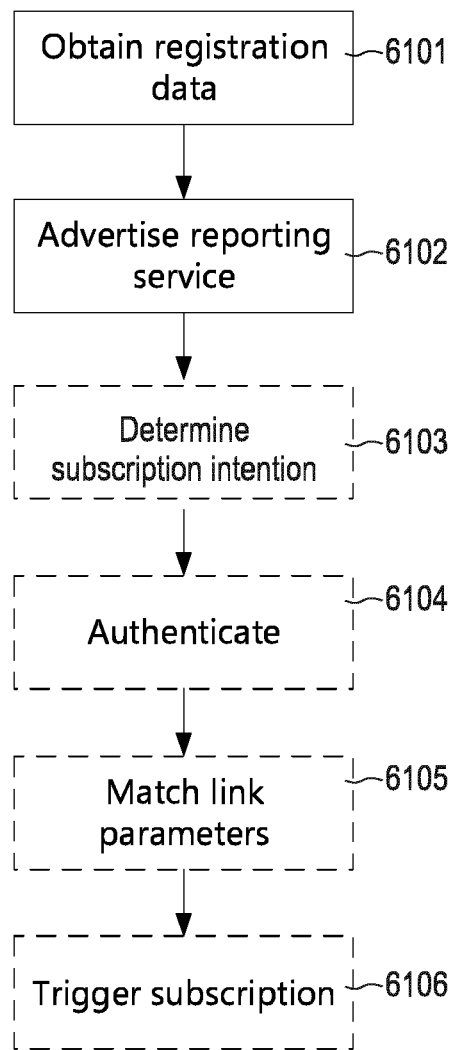
FIG. 6 is a flowchart of a method according to various examples.

FIG. 6 is a flowchart of a method according to various examples. Optional boxes are illustrated with dashed lines. The method of FIG. 6 can be executed by an NW exposure node. For instance, the NW exposure node could be implemented by the NEF 138 (cf. FIG. 1).

The method of FIG. 6 facilitates establishing a subscription for a reporting service provided by a reporting node, the reporting node supporting a data link associated with communication of application data of a data service. As such, the data service and the reporting service are associated with each other. As part of the reporting service, the reporting node provides DSI in accordance with the subscription. The DSI is indicative of a state of the data link The method commences at box 6101. At box 6101, registration data, e.g. documentation and information of an API, for the reporting service is obtained.

As a general rule, the registration data can be obtained using one or more messages. The registration data can be obtained from multiple nodes in multiple messages, or from a single node in a single message. For instance, at least a part of the registration data could be provided by the reporting node. Alternatively or additionally, at least a part of the registration data could be provided by a session-management control node, e.g., by the SMF 132 (FIG. 1).

As a general rule, registration data can be obtained for multiple reporting services provided by multiple reporting nodes. The exposure node can keep a repository in which the registration data is stored for the multiple reporting nodes.

The registration data can be indicative of a configuration of the associated reporting service. As a general rule, the reporting service may be specifically provided for a certain data link associated with a certain data service; or may be provided for multiple data links of multiple data services, based on which data links are supported by the respective reporting node.

For instance, the registration data be indicative of an address of the reporting node. Thereby, a potential subscriber can reach the reporting node by transmitting a message to the address of the reporting node.

The registration data could be indicative of a service area associated with the reporting service. The service area could specify a certain area: if a given data link is routed through this area, the reporting node may be able to provide the DSI. The service area may be specified in terms of a geographical area or may be specified in terms of a set of, e.g., BSs of the RAN that are services by the respective reporting node, e.g., the SMF 132 or the UPF.

The registration data could also include a unique identifier of a specific data link. The registration data could also include an identity of one or more UEs for which the reporting node currently supports respective data links. Such dynamic parts of the registration data may be updated from time to time, e.g., as the data link is re-routed or as the UEs re-connected to other BSs or experience mobility.

Then, at box 6102, the reporting service is advertised. For instance, based on the registration data, a respective entry can be generated in a repository that can be accessed by multiple external ANs. Queries can be received and responded to. For example, for the advertising, a publishing mechanism in accordance with CAPIF can be used. Broadcasting may be employed, but is not generally required.

It is possible that only a part of the registration data is published/exposed when advertising the reporting service at box 6102, i.e., that at least another part of the registration data is hidden from the external ANs. For instance, dynamic parts of the registration data may not be published, e.g., identities of UEs currently connected to a given BS 112, 113, specific data links currently supported by a given SMF 132 or UPF 121, etc. Since such dynamic parts of the registration data may frequently change, it may not be desirable to advertise them. Further, such dynamic parts of the registration data may be sensitive and, accordingly, not suitable for being advertised.

Next, at optional box 6103, it is determined that a given AN of multiple candidate ANs has the intention to subscribe to the reporting service. For instance, this can include receiving a respective subscription intention message from the AN.

The subscription intention message could include a data service indicator. The data service indicator could be indicative of the data service for which the associated reporting service for DSI is required. As such, the data service indicator may be indicative of an identity of the UE associated with the data service, an identifier of the respective data link, or a location of the UE, e.g., in geographical terms or with respect to a certain BS to which the UE is connected, or a cell identity. The data service indicator could also include a unique identifier for the particular data service.

At box 6104, upon determining the subscription intention of the AN, the AN can optionally be authenticated. This could be based on an identity of the AN. It would also be possible that the authentication at box 6104 is based on access credentials associated with the data service for which the subscription to the reporting service is requested. For instance, it would be conceivable that the AN has already established the data service with the UE and, as part of this establishment of the data service, has been provided with the access credentials associated with the data service. Then, the access credentials can be validated.

If the authentication of box 6104 is successful, then, at box 6105, the appropriate reporting node is determined. This can include performing a match between the data service indicator obtained from the AN, and the respective parts of the registration data. If there is a match, then, at box 6106, a subscription between the reporting node and the AN is triggered. Thus, the subscription is triggered upon determining the subscription intention at box 6103.

There may be a match at box 6105 if the data service indicator correlates with the respective parts of the registration data provided by the reporting node. This is illustrated for some examples in the Table 1 below.

TABLE 1

Examples of successful matches between data service indicator and registration data

| Example | Data service indicator | Registration data |
|---|---|---|
| A | Unique identifier of data service "A7X" | Unique identifier of data service "A7X" |
| B | UE identity "JK992" | UE identity "JK992" |
| C | BS "8K7Z" | BSs: "7JH2", "8K7Z", and "OLKJ" |

The matching can provide for the possibility to check whether a given reporting node is capable of providing the requested reporting service, and/or selecting a given reporting node from multiple registered reporting nodes to provide the requested service. The latter scenario may in particular be helpful where multiple reporting nodes provide registration data to the exposure node, but service, e.g., different service areas, different UEs, and so forth.

Triggering the subscription at box 6106 can include, e.g., providing an identity of the reporting node and/or an address of the reporting node and/or access credentials for the reporting service to the AN. Thereby, the AN can contact the reporting node with a subscription request, based on such information provided at box 6106.

Alternatively or additionally, said triggering of the subscription at box 6106 could also include providing an identity and/or address of the AN to the reporting node. A corresponding subscription request may be transmitted to the reporting node. Such information may be obtained from the AN as part of the subscription intention message. Thereby, the reporting node can be informed of the subscription intention of the AN. Respective details with respect to the establishment of the subscription are also illustrated in connection with FIG. 7.

Figure 7:
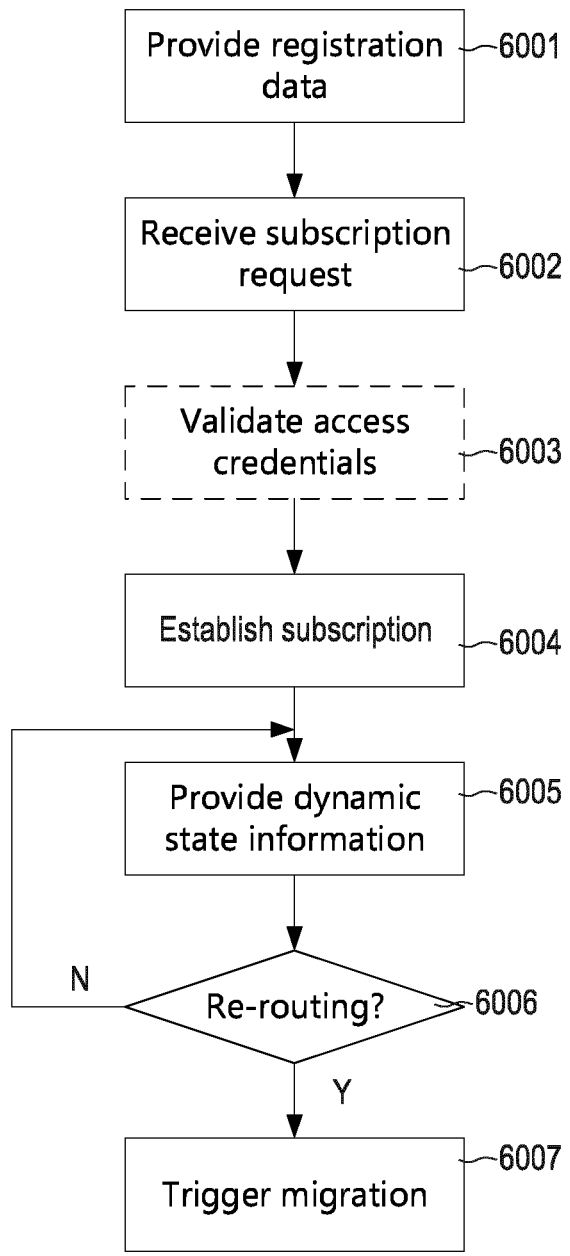
FIG. 7 is a flowchart of a method according to various examples.

FIG. 7 is a flowchart of a method according to various examples. The method of FIG. 7 is inter-related with the method of FIG. 6. The method of FIG. 7 can be executed by a reporting node that determines and provides, as part of a subscription, DSI of the data link, the data link being for communication of application data associated with a data service. As such, the data service and the reporting service can be associated with each other. The reporting node could be implemented by an access node of a RAN, i.e., a BS, e.g., by the BS 112 of the BS 113 (cf. FIG. 1). In such a scenario, the DSI may, in particular, pertain to a state of a section of the data link along a wireless link of the communications NW that is supported by the BS. In further scenarios, the reporting node could be implemented by a CN node, e.g., by a CN node of the user plane such as a gateway node, e.g., the UPF 121 (cf. FIG. 1). Here, the gateway node may handle the respective section of the data link in the CN. In yet a further scenario, the reporting node could be implemented by a control-plane CN node, e.g., the SMF 132 (cf. FIG. 1). Such CN node can control the data link along a respective section in the CN.

At box 6001, the reporting node provides registration data for the reporting service on the DSI of the data link. This may be referred to as the reporting node publishing the reporting service. The reporting node provides the registration data to exposure node, e.g., directly or indirectly via some other nodes, e.g., indirectly via a mobility-control node or a session-control node. The registration data may be implemented in accordance with an API associated with the reporting service. The registration data may, accordingly, include an API identifier. For instance, a part of the registration data may pertain to a specific data link supported by the reporting node: it would be possible that this part of the registration data is provided indirectly to the reporting node via a mobility-control node or a session-control node of the CN, e.g., the AMF 131 or the SMF 132 (cf. FIG. 1). The registration data may be provided in one or more messages. Box 6001 as inter-related with box 6101.

At box 6002, the reporting node receives a subscription request for a subscription to the reporting service in accordance with the registration data. The subscription request may include a pointer to the registration data or be otherwise associated with the registration data, e.g., using the API identifier as referred to in box 6001. In one example, the subscription request is received from the exposure node to which, at box 6001, the registration data has been provided. As such, box 6002 can be inter-related with box 6106. In such an example, the subscription request could be indicative of an identity or address of an external AN that intends to subscribe to the service. In another example, the subscription request can be received from the external AN directly; in such an example, the external AN can be provided with the identity and/or address of the reporting node by the exposure node, as has been explained above in connection with box 6106.

As a general rule, for authenticating the external AN, reference techniques as described in TS 23.502 step 2 in FIG. 4.15.3.2.3-1 could be used. Thus, the external AN may be authenticated based on information included in the subscription request (e.g., by checking in a data responsivity), or via the exposure node.

At optional box 6003, access credentials of the external AN can be validated. The access credentials can be included in the subscription request. For instance, the access credentials can be validated based on the registration data that has been previously provided at block 6001. For example, a cryptographic key pair can be used, e.g., a public-private key pair.

In case of successful validation of the access credentials, the method commences at box 6004. At box 6004, the subscription is established between the reporting node and the AN. This is based on the subscription request.

Establishing the subscription may include, e.g., transmitting a confirmation message to the AN. Establishing the subscription may include, e.g., setting respective internal transmit timers for repeatedly providing the DSI. Establishing the subscription may include, e.g., storing an address of the AN and/or an identifier of the subscription. Establishing the subscription can include triggering repetitive transmission of the DSI.

Then, at box 6005, the DSI is provided to the external AN, in accordance with the established subscription to the reporting service. This can include repeatedly transmitting a message that includes the DSI. Thereby, updates to the time-dependent DSI can be provided, e.g., in view of varying bit flows along the data link, changes in the congestion level, etc.

By providing the DSI in accordance with the subscription—the subscription being between the reporting node and the AN—it is possible to route such messages directly to the external AN, e.g., not through the exposure node. This means that, e.g., it would be possible that messages including the DSI transmitted using an address of the external AN (e.g., instead of an address of the exposure node). The address of the external AN can be obtained as part of the establishing of the subscription to the reporting service, e.g., as part of the subscription request.

As a general rule, it is possible that at least a (e.g., static) part of the registration data provided at box 6001 covers a plurality of data links that are supported by the reporting node. For instance, different ones of the plurality of data links can be associated with different services, e.g., for different UEs. Then, the DSI at box 6005 may be specific to a particular one of the plurality of data links. For instance, it would be possible that the subscription request received at box 6002 is indicative of a least one of an identity of the UE (e.g., if multiple data links of multiple UEs are supported by the reporting node) or an identifier of the data link (e.g., if multiple data links of one or more UEs are supported are supported). The DSI that is provided at box 6005 may then be specific for that particular UE or data link. The DSI provided at box 6005 may be associated with a particular data service for which application data is communicated along the data link. Accordingly, the DSI be determined depending on the at least one of the identity of the UE, or the identifier of the data link, or the data service associated with the reporting service.

From time to time, the data link may be re-routed. There can be different reasons for re-routing the data link. Example reasons include: mobility of the terminating UE; congestion of one or more nodes supporting the data link; load balancing; etc.

In the example of FIG. 7, as long as re-routing is not detected at box 6006, the DSI is continued to be provided at box 6005. If at box 6006, re-routing is detected, then the method commences at box 6007.

At box 6007, upon said detecting of the re-routing of the data link from the reporting node to a target reporting node, a migration of the subscription is triggered. The subscription is migrated to the target reporting node. I.e., the target reporting node takes over determining and providing the DSI; and the determining and reporting can stop at the initial reporting node upon completing the migration.

For instance, if—e.g., due to UE mobility—the UE connects to a different BS (handover), then the source BS, previously providing the DSI, is not supporting the respective section of the data link, anymore. The target BS of the handover is newly supporting the respective section of the data link and, accordingly, the subscription to the reporting service of the DSI can be migrated from the source BS to the target BS. In another example, UE mobility can cause a change in the BS and, along with that, a change in the UPF and/or the SMF, i.e., the CN node supporting the CN section of the data link. Also, in such a scenario a migration of the subscription can be helpful.

Triggering the migration may or may not be mediated by the exposure node that advertises the reporting service. For instance, it would be possible that the impending migration is indicated to the exposure node and then respective control signalling to execute the migration is handled by the exposure node. In another example, the migration may be transparent to the exposure node or the exposure node may be simply informed of the migration but may not take an active part in the migration itself. For instance, triggering the migration at box 6007 may include (directly) providing an indication of the subscription to the target reporting node and/or (directly) providing an indication of the target reporting node to the AN.

Figure 8:
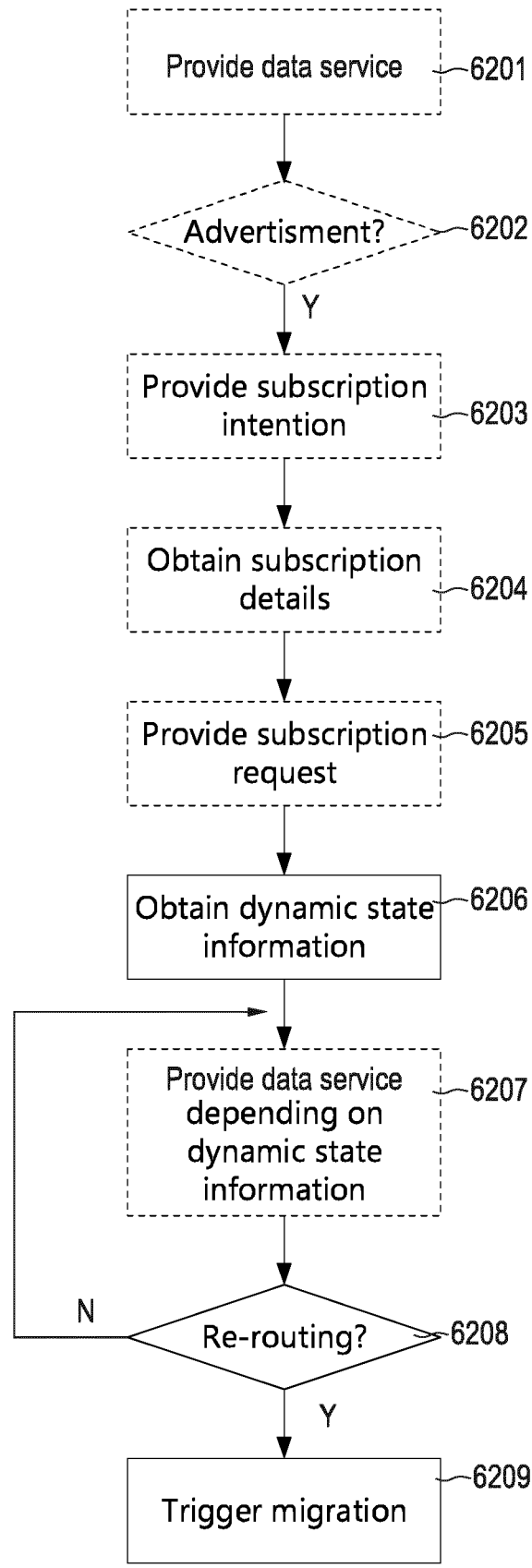
FIG. 8 is a flowchart of a method according to various examples.

FIG. 8 is a flowchart of a method according to various examples. FIG. 8 is inter-related with FIG. 6 and FIG. 7. The flowchart of FIG. 8 may be executed by an AN. For instance, the method of FIG. 8 may be executed by the AF 134 (cf. FIG. 1).

The method commences at box 6201 with the AN providing a data service. This can include controlling a server that executes an application that provides or consumes application data associated with the data service. The server may or may not be part of the AN.

Example data services described herein include, e.g.: mobile-edge computing, autonomous driving; connected industry; etc.

The data service is provided to a UE. This includes communicating application data between the UE and the server that executes the application along a data link, i.e., to the UE and/or from the UE. The data link is routed through a communications NW. The communications NW facilitates the control of the data link. For this, the AN can use an API of the communications NW. For this, the AN can communicate with and exposure node of the communications NW.

The AN can intend to enhance the provisioning of the data service based on DSI. For this, at box 6202, the AN can check whether a corresponding reporting service for the DSI is advertised by the exposure function of the communications NW. This check can be based, e.g., on the data service, e.g., the identity of the data service, a location of the UE to which the data service is provided, etc.

The reporting service is thus associated with the data service.

For example, to implement the box 6202, a corresponding repository published by the exposure node may be accessed. This can be in accordance with the CAPIF protocol. Box 6202 corresponds to box 6102 (cf. FIG. 6).

If an advertisement of a reporting service is available, then, at box 6203, the subscription intention can be provided to the exposure node. A subscription intention message can be transmitted to the exposure node. Box 6203 as inter-related with box 6103. For instance, the subscription intention message could be indicative of an identity of the UE to which the data services provided or could be indicative of a location of the UE to which the data service is provided or could be indicative of the data service.

Next, at box 6204, subscription details are obtained. For instance, this can include an address of a reporting node that can provide the DSI in accordance with the subscription between the access node and the reporting node has been established. Optionally, access credentials may be obtained. Box 6204, hence, corresponds to box 6106 (cf. FIG. 6).

Then, at box 6205, to establish the subscription, a subscription request is transmitted to the reporting node. Box 6205, hence, corresponds to box 6002 (cf. FIG. 7). In a scenario in which the exposure node provides the subscription request, it is not required that the AN transmits the subscription request, the step 6203 would be enough.

At box 6206, once the subscription has been established between the reporting node and the AN, the DSI is received. For example, a message can be repeatedly received, the message being addressed to the AN and originating from the reporting node. Box 6206 is inter-related with box 6005.

Then, at box 6207, it is possible to provide the data service depending on the DSI. For instance, buffer levels may be adjusted depending on the DSI. For instance, a codec may be adjusted depending on the state information. For instance, countermeasures can be taken in order to mitigate impending congestion. At box 6207, it would be possible to appropriately control the application associated with the data service.

At box 6208, it is checked whether the data link is re-routed to a target AN. For instance, another AN may take overall responsibility for controlling a server executing the application. If the re-routing is detected, then, at box 6209, a migration of the subscription to the target AN is triggered. If rerouting within the communication NW is detected, the AN would use new address to the target reporting node.

This can include providing an indication of the subscription to the target AN. Alternatively or additionally, an indication of the target AN can be provided to the reporting node. It would also be possible to provide an indication of the target AN to the exposure node.

Figure 9:
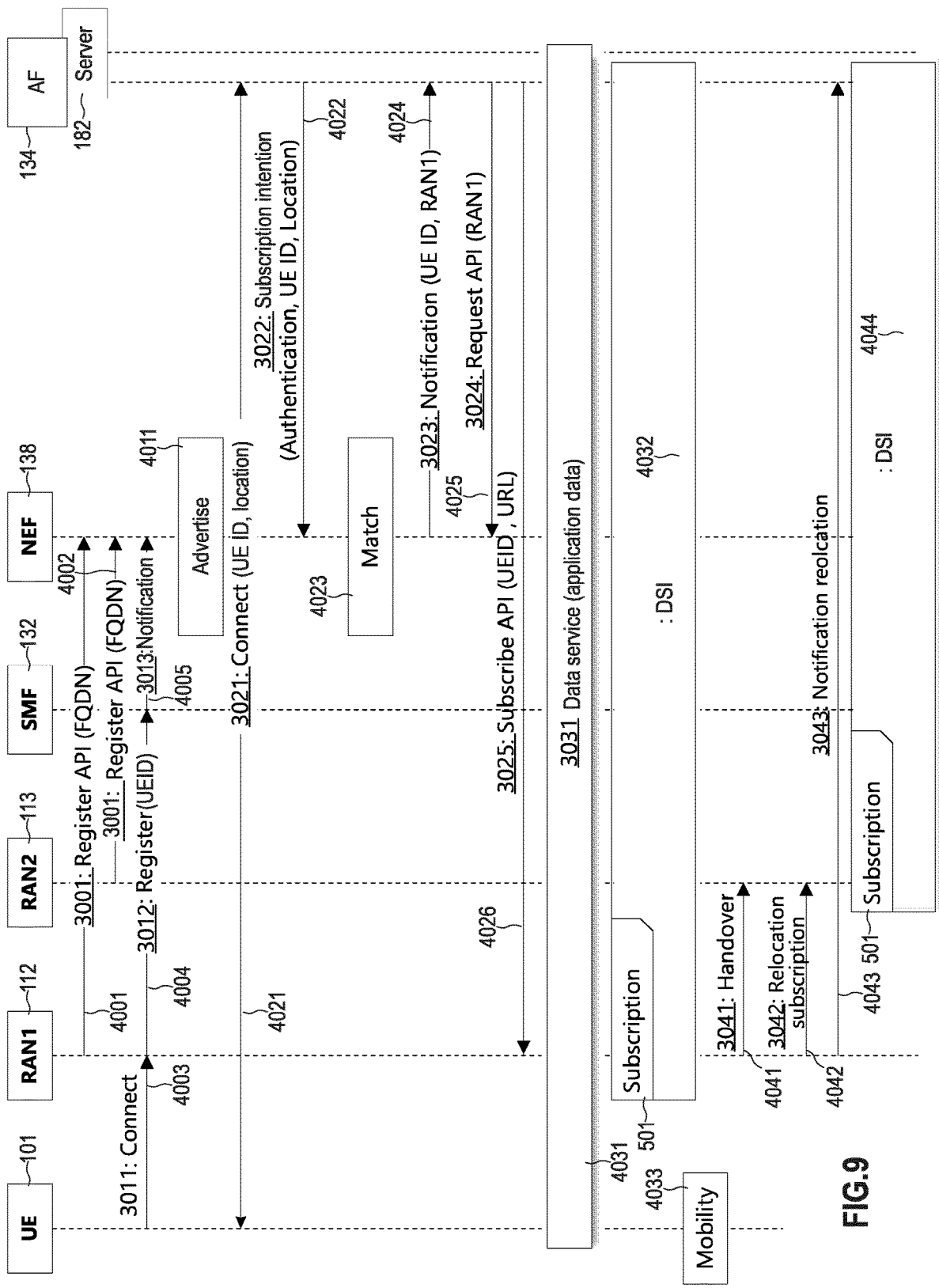
FIG. 9 is a signalling diagram of communication between various nodes according to various examples.

FIG. 9 is a signalling diagram of communication between the various nodes of the cellular NW 100 of FIG. 1. The signalling of FIG. 9 can be used to implement the methods of FIG. 6, FIG. 7, and FIG. 8. While FIG. 9 illustrates an example in which the reporting node is implemented by the BS 112, in other examples other nodes may implement the reporting node.

At 4001, the BS 112 registers the reporting service for DSI 3032 at the NEF 138. I.e., the BS 112 provides registration data 3001 for the reporting service to the NEF 138. In the example of FIG. 9, the registration data 3001 includes an address of the BS 112, here implemented by a fully qualified domain name.

Providing the registration data 3001 can correspond to exposing an API. The registration data 3001 can include the supported service area. The registration data 3001 could indicate the service area as part of the name of the API. For example, the BS 112 could expose an "mis" interface with this name syntax: "mis.<CellID>.operator.com". There, <CellID> is the Cell ID of the BS 112. Or each BS 112 can expose an API, for example "mis.operator.com" and when the BS 112 registers the API to the NEF 138 then in addition it registers the API to be valid only for a specific Cell ID, which means that the name of the API is the same.

The registration of the reporting service is not necessarily specific for a particular data link or a specific UE; the UE 101, e.g., has not yet connected to the BS 112 and, accordingly, the BS 112 does not handle a respective data link associated with the service provider to the UE 101.

Based on the registration data provided by the BS 112, the NEF 138 can create a respective entry in a repository.

At 4002, the BS 113 provides its registration data 3001 to the NEF 138. This corresponds to 4001.

Next, at 4003, the UE 101 connects to the BS 112 in order to register on the network, e.g., using a random-access procedure 3011.

At 4004, the BS 112 forwards the registration message 3012 (e.g., a NAS message) to the AMF 131 (not shown) which assigns an UEID to the UE and the AMF 131, in turn, at 4005, provides a corresponding notification message 3013 to the NEF 138 that the UE is registered to the network (e.g., for setting up PDU sessions). The message 3013 can be indicative of the identity (UE ID) of the UE 101. This identity of the UE 101 is also registration data that can be used by the NEF 138. The BS 112 provides this part of the registration data indirectly to the NEF 138, via the AMF 131.

At box 4011, the NEF 138 can then advertise the reporting service provided by the BS 112, as well as the reporting service provided by the BS 113. This is based on the registration data received at 4001-4002 and 4005. For instance, the NEF 138 can maintain a respective repository and AFs can look-up registration data in the repository. The NEF 138 may respond to queries from the AFs. As a general rule, it would be possible to advertise the reporting services even before receiving specific UE-related or data link-related information, i.e., the advertising may start before 4005.

At 4021, the UE 101 and the AF 134 establish the data service by communicating a respective connect message 3021. This is for setting up the data link 189 of the data service. The BS 112 and the SMF 132 is involved in the establishment of the data link.

At this point, the AF 134 can determine that it would be helpful to establish a reporting service associated with the data service, to obtain the DSI.

At 4022, the AF 134 accordingly transmits a subscription intention message 3022 to the NEF 138, based on the NEF 138 advertising the reporting service.

The subscription intention message 3022 can include access credentials of the AF 134, an identity of the UE 101, an identifier of the data service, an identifier of the data link 189 and/or a location of the UE 101.

The location of the UE may, as a general rule, be expressed as a cell identity of the serving cell or the IP address of the serving BS.

Such data included in the subscription intention message 3022 may be next matched, at box 4023, to the respective repository maintained by the NEF 138. The NEF 138 can accordingly compare/match the data included in the subscription intention message 3022 with the registration data of, e.g., the registration messages 3001 received from the BS 112 and the BS 113 at 4001 and 4002, and/or with the registration data included in the message 3013. The appropriate BS 112, 113 to handle the subscription intention can be selected. Corresponding techniques have been explained above in connection with Table 1.

In the example of FIG. 9, the NEF 138 selects the BS 112 to participate in the subscription of the reporting service, because the BS 112 supports the data link 189 for which the AF 134 requires the DSI.

While in the scenario of FIG. 9, the UE 101 provides information on the UE identity and/or the location of the UE 101 to the AF 134, in other examples, it would also be possible that such information on the UE identity and/or the location is provided by the NEF 138 to the AF 134, upon a respective query of the AF 134, e.g., external UE identifier such as MSISDN or based on an identifier of the data link 189 and/or an identifier of the data service (not shown in FIG. 9).

Based on the match at box 4023, next, the NEF 138 provides configuration data 3023 of the subscription to the AF 134. The configuration data 3023 includes the address of the BS 112. The configuration data 3032 could also include access credentials for the reporting service.

Using the address and/or the access credentials of the BS 112, the AF 134 can then transmit a subscription request 3025 to the BS 112. The subscription request 3035 is associated with the registration data previously provided by the BS 112; as such, the BS 112 can link the subscription request to the particular reporting service requested.

Based on this subscription request 3025, the subscription 501 to the reporting service is then established between the BS 112 and the AF 134. Accordingly, the BS 112 provides the DSI 3032 by repeatedly transmitting a respective message at 4032 addressed to the AF 134, in accordance with the subscription 501.

The data service is provided to the UE 101 and at 4031, respective application data 3031 is communicated between the UE 101 and the server 182 hosting the AF 134 along the data link 189. The data service is associated with the reporting service.

FIG. 9 also illustrates aspects with respect to a re-routing of the data link 189. As a general rule, such aspects are optional. Such aspects are described next below.

Next, a UE mobility occurs at 4033. This triggers, at 4041, a handover signaling 3041 from the BS 112 to the BS 113. The AMF 131 and the SMF 132 may be informed accordingly (not illustrated in FIG. 9).

At 4042, upon detecting the respective re-routing of the data link 189 from the BS 112 to the BS 113, a migration of the subscription 501 from the BS 112 to the BS 113 is triggered by transmitting a respective relocation message 3042 from the BS 112 to the BS 113. The relocation message 3042 can include an indication of the subscription, e.g., an identifier of the reporting service and/or an indication of the AF 134.

At 4043, the AF 134 is notified by transmitting a respective notification message 3043 that could be, e.g., indicative of the BS 113, e.g., by including a respective address or cell identity, etc.

A UE context associated with the data service may also be migrated from the BS 112 to the BS 113, according to legacy implementation.

While in the example of FIG. 9, the subscription is migrated from the BS 112 to the BS 113 without involving the NEF 138, in another example the subscription between the BS 112 and the NEF 138—upon re-routing of the data link 189—may be resolved, and the AF 134 may establish a new subscription with the BS 113, in a similar manner as explained above in connection with the subscription between the BS 112 and the AF 134. In yet another example, the NEF 138 may be mediating the migration by handling respective messages between the BS 112 and the BS 113.

In the example of FIG. 9, the data link 189 is re-routed in the cellular NW 100. In other examples, the data link 189 may be re-routed by switching to another AF. Such an example is illustrated in FIG. 10.

Figure 10:
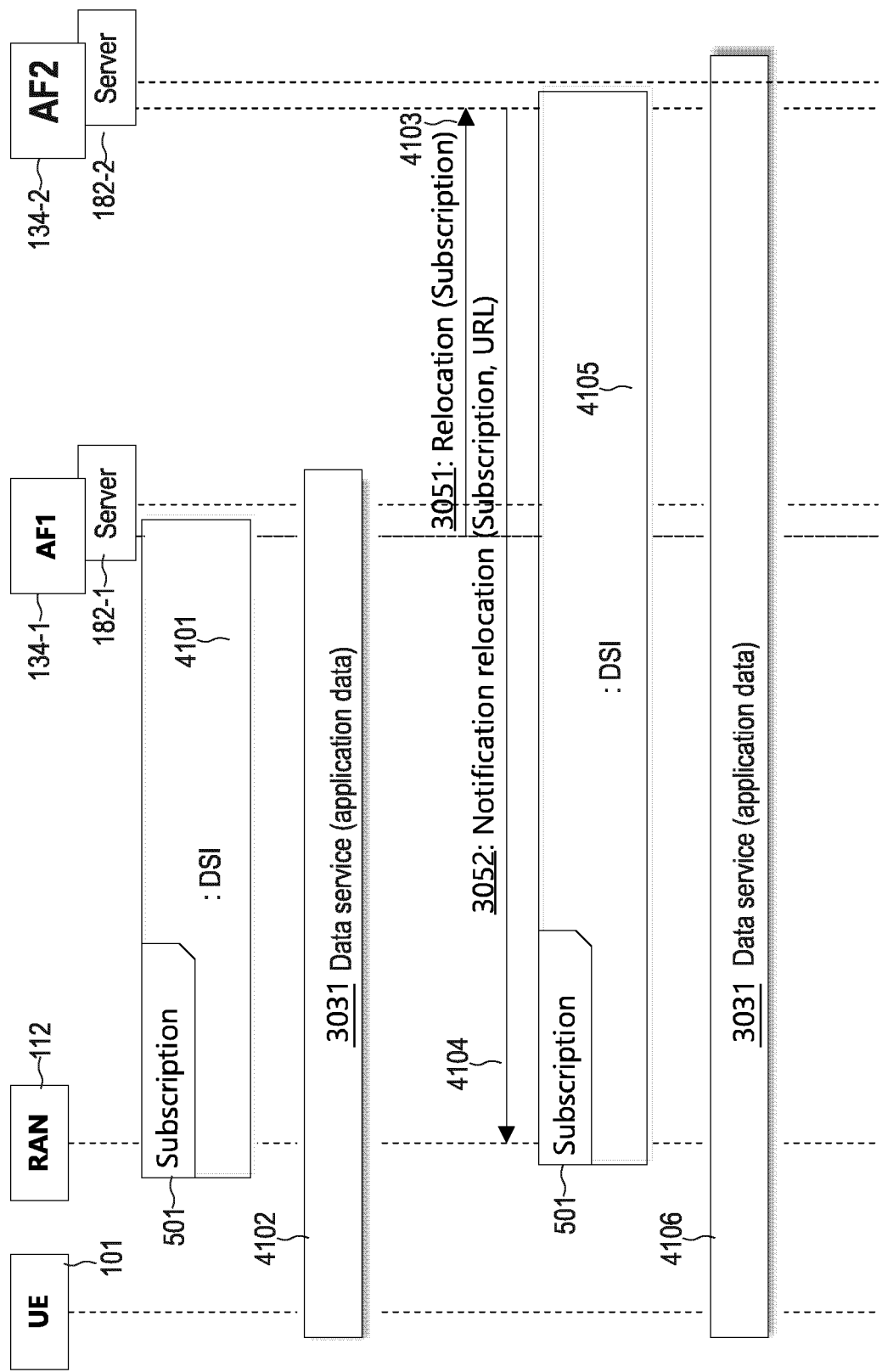
FIG. 10 is a signalling diagram of communication between various nodes according to various examples.

FIG. 10 illustrates signalling between the BS 112 and the AF 134-1 and the AF 134-2. For instance, it would be possible that the signalling of FIG. 10 commences after 4031 of the signalling of FIG. 9.

Initially, the subscription 501 is established between the BS 112 and the AF 134-1. Accordingly, the BS 112 repeatedly transmits messages including the DSI 3032, at 4101.

Then, the data link 189 of the data service used for transmitting the application data 3031 at 4102 is re-routed from the server 182-1 of the AF 134-1 to the server 182-2 of the AF 134-2, see 4106 (the corresponding control signalling is not shown in FIG. 10).

The reporting service is migrated along with the migration of the data service: The subscription 501 is migrated accordingly, by transmitting a respective relocation message 3051 from the AF 134-1 to the AF 134-2. The relocation message 3051 is indicative of the subscription, e.g., by including a respective identifier. It would be possible to alternatively or additionally provide an indication of the BS 112, e.g., the address, etc. Access credentials may be provided to the AF 134-2.

Next, the AF 134-2 notifies the BS 112 of the migration and, subsequently, the subscription 501 has been migrated from the AF 134-1 to the AF 134-2 such that the DSI 3032 can be transmitted by the BS 112 to the AF 134-2 at 4105.

While in the example of FIG. 10 a scenario is illustrated in which the relocation of the subscription from the AF 134-1 to the AF 134-2 is implemented without involvement of the NEF 138, in other examples, the NEF 138 may be involved. For instance, the migration may be handled by the NEF 138. It would also be conceivable that the AF 134-2 provides a subscription intention to the NEF 138, e.g., as explained in connection with the subscription intention message 3022 in FIG. 9 for the AF 134.

Summarizing, above, techniques have been described which facilitate identifying multiple BSs or other reporting node for a reporting service on DSI of a data link of a data service at a NW exposure node, for northbound advertising to external ANs. For instance, the address or cell identity of such reporting nodes may be advertised or provided upon reception of a corresponding subscription intention to the external AN. Similar techniques may also be applied for other core-NW node such as SMF or UPF.

The DSI can include radio access NW related "run-time" information. The DSI could also include core NW related "run-time" information.

Techniques have been described which facilitate service continuity of the reporting service in case of a re-routing of the data link.

In particular, in the 3GPP NR framework, when the reporting node—e.g., BS or UPF—has defined an API or set of APIs for different purposes with relevant DSI, then the reporting node can expose the API in CAPIF as an AEF (API Exposing Function). This allows a CAPIF API Invoker to use the API directly without affecting any interface, e.g., RAN to AMF and then to NEF/SCEF. This CAPIF API Invoker—i.e., the subscriber to the reporting server—could be any AF or server on internet regardless if it is within the same trusted domain as the operator of the cellular NW or not. The reporting node could for example be a RAN node or any other NF within the CN, e.g. SMF/UPF. SMF/UPF could for example expose the actual QoS congestion information etc.

The reporting node can operate according to a new interface, e.g., ETSI MEC RNIS look alike interface, for providing the DSI. This interface can be registered in NEF/CAPIF/AEF by each reporting node that supports that interface. When an AN wants to use that interface—i.e., wants to subscribe to the reporting service—it requests it from NEF and NEF (with the help of an UDM) will take care of access rights, polices, etc., and if the AN is authorized then the AN will be able to use the reporting service API from the reporting node directly, from that point onwards and continue to do that in the future. This allows low latency exposure/notification of the DSI from the reporting node to the AN without to be transferred via AMF, SMF, and NEF.

In 3GPP, the requirement has been that RAN should not have any interface used by an external AN directly, since the AN may be located outside of the trusted domain and RAN will not handle access right, polices etc. With the solution above, a BS in the RAN can use the new interface in addition to the existing one to AMF, but RAN does not need to handle AF authorization, authentication, polices, etc.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

Various examples have been described in the context of the AN subscribing to the reporting service being implemented by the 3GPP 5G AF. In other examples, the AN may be implemented by another type of node, e.g., a EC server, an Internet server, etc.

While various examples have been described in which the subscription is between the reporting node and the AN, in other examples the subscription could be between the reporting node and the server execution the application associated with the service.

The invention claimed is:

1. A method of operating a node of a communications network, the node being configured to support at least one data link between the communications network and a terminal, the method comprising:
providing registration data for a reporting service on dynamic status information of the at least one data link to an exposure node of the communications network;
upon receiving a subscription request for a subscription to the reporting service, establishing the subscription to the reporting service between the node and an external application node associated with the subscription request; and
providing the dynamic status information in accordance with the subscription to the external application node,
wherein the node is a control-plane core network node or a user-plane core network node of a core network of the communications network,
wherein a data service associated with the reporting service is provided for supporting communication of data between the terminal and the external application node along the at least one data link.

2. The method of claim 1, wherein the subscription request is received from the external application node.

3. The method of claim 1, wherein the subscription request comprises an address of the external application node, wherein said providing of the dynamic status information comprises repeatedly transmitting a message addressed to the address of the external application node, the message comprising the dynamic status information.

4. The method of claim 1, wherein the subscription request is indicative of at least one of an identity of the terminal, the data service associated with the reporting service, or an identifier of the at least one data link, wherein the method further comprises:
determining the dynamic status information depending on the at least one of the identity of the terminal, the data service associated with the reporting service, or the identifier of the at least one data link.

5. The method of claim 1, wherein the subscription request comprises access credentials for the reporting service, wherein the method further comprises:
validating the access credentials.

6. The method of claim 1, wherein the registration data comprises at least one of an indication of a service area associated with the reporting service, reporting service API, an identifier of the at least one data link, an identity of the terminal, and an address of the node.

7. The method of claim 1, wherein the dynamic status information comprises at least one of a bit flow along the at least one data link, a quality of service of a communication along the at least one data link, a mobility state of the terminal, or a congestion level associated with the at least one data link.

8. The method of claim 1, further comprising:
upon detecting a re-routing of the at least one data link from the node to a target node, triggering a migration of the subscription to the target node.

9. The method of claim 8, wherein said triggering of the migration comprises at least one of providing an indication of the subscription to the target node, an indication of the external application node to the target node, or providing an indication of the target node to the external application node.

10. A method of operating an exposure node of a communications network, the method comprising:
obtaining registration data from a plurality of_control-plane core network nodes or a plurality of user-plane core network nodes of a core network of the communications network, the registration data being for reporting services provided by the plurality of control-plane core network nodes or the plurality of user-plane core network nodes of the communications network, the plurality of control-plane core network nodes or the plurality of user-plane core network nodes supporting at least one data link between a terminal and the communications network, the reporting services being for dynamic status information of the at least one data link;
maintaining a repository associating the reporting services with respective ones of the plurality of control-plane core network nodes or the plurality of user-plane core network nodes of a core network; and
advertising the reporting services to multiple candidate external application nodes.

11. The method of claim 10, further comprising:
upon receiving a subscription intention message from an external application node of the multiple candidate external application nodes based on said advertising, triggering an establishment of a subscription of the external application node to the reporting service.

12. The method of claim 11, wherein said triggering the subscription comprises providing at least one of an address of the node or access credentials for the reporting service to the external application node.

13. The method of claim 11, wherein said triggering of the subscription comprises providing an identity of the external application node to the node.

14. The method of claim 11,
obtaining at least one of a location of the terminal, an identifier of the at least one data link from the external application node, an identifier of a data service associated with the reporting service, or an identity of the terminal, and determining a match between the registration data and the at least one of the location of the terminal, the identity of the terminal, the identifier of the data service associate with the reporting service, or the identifier of the at least one data link, wherein the subscription is selectively triggered depending on said determining of the match.

15. A method of operating an external application node connected to a communications network, the method comprising:

establishing a subscription to a reporting service provided by a control-plane core network node or a user-plane core network node of a core network of the communications network, the control-plane or user-plane core network node supporting at least one data link between the communications network and a terminal, the reporting service being for dynamic status information of the at least one data link;

obtaining the dynamic status information in accordance with the subscription from the node; and participating in a data service associated with the reporting service to communicate data between the terminal and the external application node via the at least one data link.

16. The method of claim 15, further comprising:

depending on the dynamic status information, controlling provisioning of the data service to and/or from the terminal using communication of application data of the data service along the at least one data link.

17. The method of claim 15, further comprising:

upon detecting a re-routing of the at least one data link from the external application node to a target external application node, triggering a migration of the subscription to the target external application node.

18. The method of claim 17, wherein said triggering of the migration comprises at least one of:

providing an indication of the subscription to the target external application node;

providing an indication of the target external application node to the node; and/or providing an indication of the target external application node to an exposure node.

* * * * *